Patented Dec. 8, 1953

2,662,073

UNITED STATES PATENT OFFICE 2,662,073

GLUCONAMIDES

Charles L. Mehltretter and John C. Rankin, Peoria, Ill., assignors to the United States of America as represented by the Secretary of Agriculture No Drawing. Application April 27, 1951, Serial No. 223,429

8 Claims. (Cl. 260—102)

(Granted under Title 35, U. S. Code (1952), sec. 266)

The invention herein described may be manufactured and used by or for the Government of the United States of America for governmental purposes throughout the world without the payment to us of any royalty thereon.

This invention relates to novel derivatives of gluconic acid amide, and relates particularly to gluconamides wherein one hydrogen of the amido nitrogen atom is replaced by a hydrocarbon radical containing eight or more carbon atoms.

This application is a continuation-in-part of application Ser. No. 85,711, filed April 5, 1949, for "Substituted Gluconamide" by Mehltretter, Mellies and Rankin. In the prior application long chain substituted gluconamides are sulfated to produce chemical compounds possessing valuable detergent properties.

The compounds of this invention may be represented by the following structural formula:

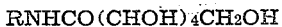

in which R is a hydrocarbon radical selected from aliphatic radicals having from 8 to 18 carbon atoms, cycloaliphatic radicals having from 8 to 18 carbon atoms, and rosin radicals. This class of novel chemical compounds possesses valuable surface-active properties. They are valuable wetting agents and possess peculiar advantages characterizing non-ionic substances. Several compounds included in the present invention possess surprising solubility in concentrated caustic alkali and are, therefore, valuable for use in the mercerization of cotton and in the manufacture of viscose yarn. This is in contrast to most commercial anionic wetting agents which have extremely low solubility in dilute alkali and are practically insoluble in alkali concentrations above 15–20 percent.

The compounds of this invention are prepared by condensing long chain aliphatic or cycloaliphatic primary amines with δ-gluconolactone. The primary amines include straight and branch chain aliphatic, either saturated or unsaturated amines, such as 2-ethylhexylamine, 3,5,5-trimethylhexylamine, octylamine, decylamine, octadecadienylamine, dodecylamine, and the like. Also included are the so-called rosin amines, such as dehydroabietylamine, dihydroabietylamine, tetrahydroabietylamine, and dextropimarylamine. Mixtures of the rosin amines, or the individual constituents may be employed. In the specific examples given below, the rosin amine employed was a commercial product, rosin amine D, having a molecular weight of the range of 332.5 to 338.5. The products of this invention differ in degree, one from the other, in water solubility. The branch chain compounds, such as N-2-ethylhexyl-δ-gluconamide or N-3,5,5-trimethylhexyl-δ-gluconamide are quite soluble in water; whereas, the straight chain compounds, such as N-octyl-δ-gluconamide tend to be insoluble in water. The water solubility of the latter products may be enhanced by the addition of minor amounts of borax or other solubilizer.

The following specific examples illustrate the invention.

EXAMPLE 1

*Preparation of N-2-ethylhexyl-δ-gluconamide*

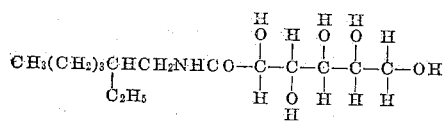

A solution was prepared consisting of 23.2 g. of 2-ethylhexylamine in 250 ml. of methanol. This solution was placed on a steam bath and 32 g. of δ-gluconolactone was added portionwise over a 15-minute period. The mixture was refluxed for 15 minutes and then cooled. The white product which crystallized was removed by filtration, washed with cold ethanol and dried at 60° C. A first crop of 27.9 g. was obtained, M. P. 116°–118° C. Two more crops totalling 24.6 g. were isolated from the mother liquor, giving a total yield of crude product of 95 percent of theory.

After recrystallization from ethanol the N-2-ethylhexyl-δ-gluconamide melted at 117°–118° C.

Analysis: Calc'd for: C14H29O6N: N, 4.5 percent. Found: N, 4.5 percent.

EXAMPLE 2

*Preparation of N-3,5,5-trimethylhexyl-δ-gluconamide*

A solution was prepared consisting of 43.0 g. of 3,5,5-trimethylhexylamine in 350 ml. of methanol. To this was added 53.4 g. of δ-gluconolactone. The solution was refluxed for 1 hr. and then cooled to 15° C. The white product was crystallized, was removed by filtration, washed with cold methanol and dried at 60° C. A first crop of 56.8 g. was obtained, M. P. 131°–133° C. Another crop of 25.8 g., M. P. 130°–131.5° C., was isolated from the mother liquor, giving a total yield of 95.6 percent of theory. In a similar manner, additional substituted gluconamides were prepared. The data obtained are summarized in the following table.

TABLE I

| Example No. | Gluconamide | Percent Yield | M. P. °C. | Percent Found | Nitrogen Theory |
|---|---|---|---|---|---|
| 3 | octyl | 95.5 | 156–157 | 4.6 | 4.6 |
| 4 | decyl | 90 | 153–154 | 4.2 | 4.2 |
| 5 | dodecyl | 94.5 | 152–154 | 3.8 | 3.9 |
| 6 | tetradecyl | 83 | 153–154 | 3.6 | 3.6 |
| 7 | octadecadienyl | 86 | 145–146 | 3.1 | 3.2 |
| 8 | rosin | 89 | 141–142 | 3.0 | 2.7 |

As previously stated, the products of this invention possess valuable surface-active properties. By virtue of their non-ionic character, they exhibit metallic ion stability and hence do not induce the precipitation of insoluble salts. Also, as previously noted, the solubility of certain of the products, particularly those derived from straight chain amines may be enhanced by the use of solubilizers, such as borax. Our products possess the additional advantage over many commercially used wetting agents in that they may be isolated, transported, and stored in the dry form.

In addition to the forgoing advantages, those products of this invention derived from relatively highly branched aliphatic amines are stable in alkaline solutions. The product of Example 2, for instance, is 0.9 percent soluble in 31 percent sodium hydroxide solution. This property, together with its effective lowering of surface tension, renders it particularly valuable in the textile industry.

The following table summarizes surface-active data for representative examples of this invention. Included also in Table II, for comparison purposes, are the corresponding data for a commercial wetting agent, Santomerse No. 3 (the sodium salt of an alkylaryl sulfonate.).

TABLE II

| Product | Surface Tension Dynes/cm.² (25° C.) | | Interfacial Tension Dynes/cm.² (25° C.) | | Standard Canvas Disc Method (Wetting time, sec.) | | Draves-Clarkson Method (Wetting time, sec.) | |
|---|---|---|---|---|---|---|---|---|
| | Conc. of Solution | | Conc. of Solution | | Conc. of Solution | | Conc. of Solution | |
| | 1.0% | 0.25% | 1.0% | 0.25% | 0.5% | 0.25% | 0.5% | 0.25% |
| Example No. 1 | 31.4 | 43.3 | | | | | | |
| Example No. 2 | 26.4 | 34.3 | 5.5 | 4.1 | 4.8 | 49.0 | at once | 9.6 |
| 71% Example No. 3 + 29% borax | 28.7 | 24.2 | | | 5.4 | 7.6 | 5.7 | 8.8 |
| Santomerse #3 | 30.6 | 31.7 | 3.9 | 4.8 | 3.9 | 7.8 | 4.4 | 5.2 |

We claim:
1. A compound of the formula:

$$RNHCO(CHOH)_4CH_2OH$$

in which R is a hydrocarbon radical taken from the group consisting of alkyl radicals having from 8 to 18 carbon atoms and rosin radicals.
2. The compound of claim 1 in which R is an alkyl radical having from 8 to 18 carbon atoms.
3. N-2-ethylhexyl-δ-gluconamide.
4. N-3,5,5-trimethylhexyl-δ-gluconamide.
5. N-octyl-δ-gluconamide.
6. N-dodecyl-δ-gluconamide.
7. N-tetradecyl-δ-gluconamide.
8. The compound, N-rosin gluconamide.

CHARLES L. MEHLTRETTER.
JOHN C. RANKIN.

References Cited in the file of this patent
UNITED STATES PATENTS

| Number | Name | Date |
|---|---|---|
| 1,901,565 | Pasternack | Mar. 14, 1933 |
| 2,084,626 | Tabern | June 22, 1937 |
| 2,443,903 | Filbert | June 22, 1948 |

OTHER REFERENCES

Van Wijk: "Rec. Trav. Chim. Pays Bas," vol. 40 (1921), pp. 221–46.

Colon et al.: "J. Am. Chem. Soc.," vol. 71 (1949), pp. 1493–4.